United States Patent [19]

Abe

[11] Patent Number: 5,126,972
[45] Date of Patent: Jun. 30, 1992

[54] ARRANGEMENT AND METHOD OF ASCERTAINING MEMORY ADDRESSES WHICH HAVE BEEN ACCESSED DURING PROGRAM EXECUTION

[75] Inventor: Fumihiro Abe, Tokyo, Japan
[73] Assignee: NEC Corporation, Tokyo, Japan
[21] Appl. No.: 565,025
[22] Filed: Aug. 8, 1990
[30] Foreign Application Priority Data
 Aug. 8, 1989 [JP] Japan ............................. 1-205965
[51] Int. Cl.[5] ............................. G11C 7/00; G11C 8/00
[52] U.S. Cl. ............................. 365/189.01; 365/189.08; 365/238.5
[58] Field of Search ............... 365/189.01, 189.08, 365/238.5, 230.06, 230.03
[56] References Cited

U.S. PATENT DOCUMENTS 4,780,855 10/1988 Iida et al. ............... 365/189.08 X
4,796,229 1/1989 Greer, Jr. et al. ............ 365/189.08
4,878,200 10/1989 Asghar et al. ............ 365/189.08 X
4,926,386 5/1990 Park ........................... 365/189.08 X Primary Examiner—Alyssa H. Bowler
Attorney, Agent, or Firm—Helfgott & Karas

[57] ABSTRACT

Addresses of a main memory, which have been accessed by a central processing unit, are ascertained during the execution of a program stored in the main memory. A decoder is provided for receiving a predetermined number of lower n bits of main memory address bits and generates an output consisting of $2^n$ bits (n is a positive integer). A memory includes a plurality of binary cells which correspond to memory cells of the main memory on a one by one basis. A logic circuit receives first and second data. The first data is the output of the decoder and the second data is one cell data retrieved from the memory. The logic circuit implements logical sum on the first and second data and superimposes the output thereof on the memory cell from which the second data has been derived. After the execution of the program is terminated, the contents of the memory are dumped.

7 Claims, 5 Drawing Sheets

ARRANGEMENT AND METHOD OF ASCERTAINING MEMORY ADDRESSES WHICH HAVE BEEN ACCESSED DURING PROGRAM EXECUTION

BACKGROUND OF THE INVENTION

1. Field of the Invention

The present invention relates generally to a digital data processing system, and more specifically to an arrangement and method of testing a program by ascertaining memory addresses which have been accessed by a central processing unit during the execution of the program.

2. Description of the Prior Art

It is important to know that a computer program meets its specifications. One known approach to testing the execution of a program is to check the outputs of a data processing system, which outputs are obtained in response to sample data inputted to the data processing system. In other words, the known program testing looks upon a data processing unit simply as a black box. More specifically, a program(s) previously stored in the black box is supplied with sample data, presumed to be representative and to cover the necessary extreme cases, and thereafter the results thereof are compared with known or expected answers.

However, this type of diagnostic approach does not specify any task which has processed by a central processing unit (CPU) and accordingly is devoid of any means of ascertaining which addresses the CPU has accessed during the execution of a program.

SUMMARY OF THE INVENTION

It is an object of the present invention to provide an arrangement and method of determining memory accesses by a central processing unit.

Another object of the present invention is to provide an arrangement and method of ascertaining memory access by a CPU by way of storing a discriminating bit in binary cells of a register circuit, whose binary cells are assigned to memory cells (for example, bytes) of a memory to be accessed by the CPU on a one-by-one basis.

In brief, the above objects are achieved by an arrangement by which addresses of a main memory, which have been accessed by a central processing unit, are ascertained during the execution of a program stored in the main memory. A decoder is provided for receiving a predetermined number of lower n bits of main memory address bits and generates an output consisting of $2^n$ bits (n is a positive integer). A memory includes a plurality of binary cells which correspond to memory cells of the main memory on a one by one basis. A logic circuit receives first and second data. The first data is the output of the decoder and the second data is one cell data retrieved from the memory. The logic circuit implements logical sum on the first and second data and superimposes the output thereof on the memory cell from which the second data has been derived. After the execution of the program is terminated, the contents of the memory are dumped.

More specifically a first aspect of the present invention comes in a relay circuit comprising: a central processing unit; first memory means, the first memory means being operatively coupled to the central processing unit via a plurality of buses, the first memory means including a plurality of memory cells which are specified by a plurality of address bits; decoding means, the decoding means receiving a predetermined number of lower n bits of the plurality of address bits and generating an output consisting of $2^n$ bits (n is a positive integer); second memory means, the second memory means having a plurality of binary cells, the binary cells corresponding to the memory cells of the first memory means on a one to one basis; and a logic circuit, the logic circuit receiving first and second data, the first data being the output of the decoding means and the second data being one cell data retrieved from the second memory means, the logic circuit implementing logical sum on the first and second data and superimposing the output thereof on the memory cell from which the second data has been derived.

A second aspect of the present invention comes in an arrangement for ascertaining addresses of a main memory which have been accessed by a central processing unit during the execution of a program stored in the main memory, the arrangement comprising: decoding means, the decoding means receiving a predetermined number of lower n bits of main memory address bits and generating an output consisting of $2^n$ bits (n is a positive integer); memory means, the memory means having a plurality of binary cells, the binary cells corresponding to the memory cells of the main memory on a one by one basis; and a logic circuit, the logic circuit receiving first and second data, the first data being the output of the decoding means and the second data being one cell data retrieved from the memory means, the logic circuit implementing logical sum on the first and second data and superimposing the output thereof on the memory cell from which the second data has been derived.

A third aspect of the present invention comes in an arrangement comprising: a central processing unit; first memory means, the first memory means being operatively coupled to the central processing unit via an address bus, a data bus and a control bus, the first memory means including a plurality of memory cells which are specified by a plurality of address bits; decoding means, the decoding means being coupled to the address bus and receiving a predetermined number of lower n bits of the plurality of address bits and generating an output consisting of $2^n$ bits (n is a positive integer); second memory means, the second memory means being coupled to the address bus and the control bus, the second memory means having a plurality of binary cells, the binary cells corresponding to the memory cells of the first memory means on a one by one basis; a logic circuit, the logic circuit receiving first and second data, the first data being the output of the decoding means and the second data being one cell data retrieved from the second memory means, the logic circuit implementing logical sum on the first and second data and superimposing the output thereof on the memory cell from which the second data has been derived; first control means, the first control means being coupled to the data and control buses and the second memory, the first control means allowing to dump the second memory means; and second control means, the second control means being coupled to control the decoding means, the second memory means and the logic circuit.

A fourth aspect of the present invention comes in a method of ascertaining addresses of a main memory which have been accessed by a central processing unit during the execution of a program stored in the main memory, the method comprising the steps of: (a) arranging a plurality of binary cells, the binary cells corresponding to the memory cells of the main memory on a one by one basis; (b) receiving a predetermined number of lower n bits of main memory address bits and generating an output consisting of $2^n$ bits (n is a positive integer); and (c) receiving first and second data, the first data being generated at the step (b) and the second data being one cell data retrieved from the memory means, and implementing logical sum on the first and second data and superimposing the output thereof on the memory cell from which the second data has been derived.

BRIEF DESCRIPTION OF THE DRAWINGS

The features and advantages of the present invention will become more clearly appreciated from the following description taken in conjunction with the accompanying drawings in which like elements are denoted by like reference numerals and in which.

DETAILED DESCRIPTION OF THE PREFERRED EMBODIMENTS

Figure 1:
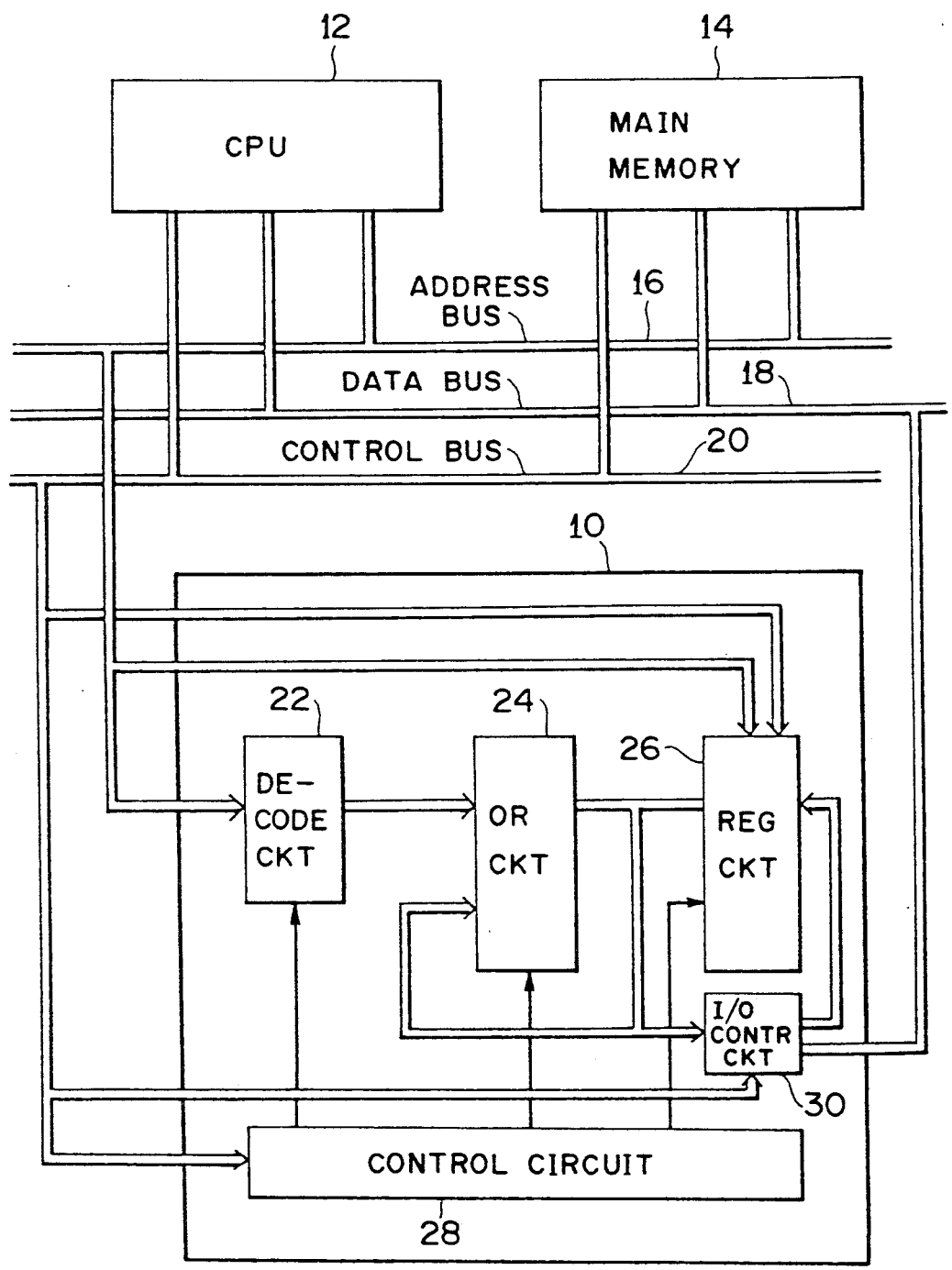
FIG. 1 is a block diagram schematically showing an embodiment of this invention.

Reference is now made to FIG. 1, wherein a preferred embodiment of this invention is schematically illustrated in block diagram form.

The FIG. 1 arrangement generally comprises a program testing arrangement 10 with which the present invention is directly concerned, a central processing unit (CPU) 12, and a main memory 14.

The CPU 12 is interconnected with the main memory 14 via an address bus 16, a data bus 18 and a control bus 20. The program testing arrangement 10 includes a decoder circuit 22, an OR gate circuit 24, a register 26, a control circuit 28, and an input/output control circuit 30, all of which are coupled as shown.

The address bus 16 extends to the decoder circuit 22 and also to the register circuit 26, while the data bus 18 to the input/output control circuit 30. The control bus 20 is coupled to the control circuit 28 and the input/output control circuit 30.

Figure 2:
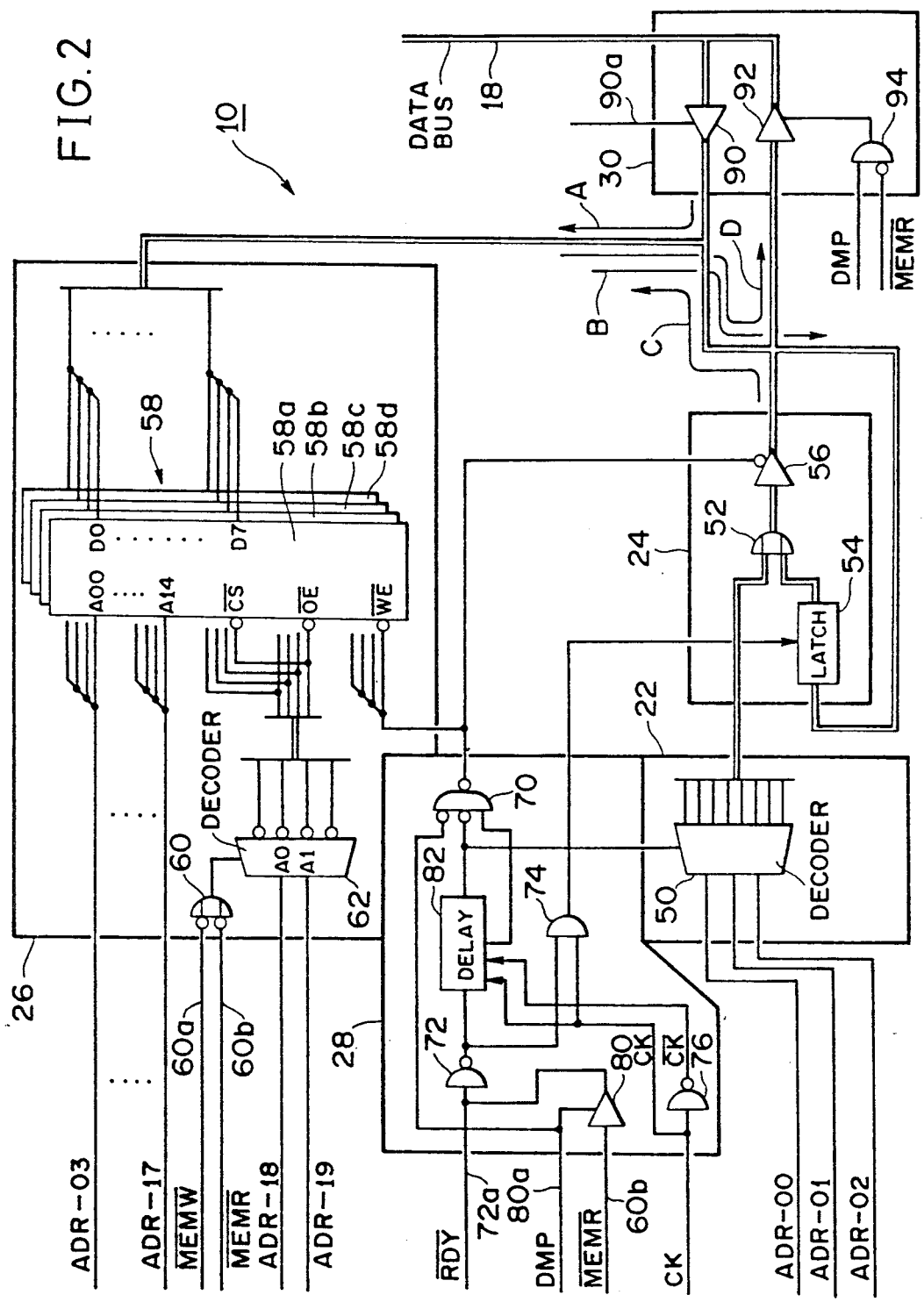
FIG. 2 is a block diagram showing in detail an arrangement which forms part of the FIG. 1 arrangement.

FIG. 2 shows in detail the program testing unit 10 in block diagram form. It is assumed in this particular embodiment that the main memory 14 has a storage capacity of 1 megabyte (viz., 1,048,576 bytes) and accordingly the address bus 16 (FIG. 1) includes 20 address lines ADR-00 to ADR-19.

A decoder 50 of the decoder circuit 22, is coupled to the lower 3-bit lines ADR-00, ADR-01 and ADR-02 of the address bus 16 (FIG. 1). The decoder 50 is rendered operative in response to a control signal from a delay circuit 82 of the control circuit 28. The decoder 50 determines the meaning of a set of data which appears on the lower 3-bit lines ADR-00 to ADR-02, and outputs an 8-bit ($=2^3$) data therefrom. The output of the decoder 50 is applied to an OR gate 52 which forms part of the OR gate circuit 24. The OR gate 50 is also supplied with an 8-bit data which is outputted from the register circuit 26 by way of a latch 54, and applies or returns back the output thereof (8-bit) to the register circuit 26 via a triple-state gate 56. These operations will be discussed in more detail later.

As shown, the register circuit 26 includes a memory chip assembly (sometimes referred to a memory) 58, an OR gate 60, and a decoder 62. The memory chip assembly 58 consists of four memory chips 58a, 58b, 58c and 58d in this embodiment. Each of these memory chips 58a–58d has 15 address input terminals A00–A14 which are respectively coupled to the address lines ADR-03 to ADR-17, while having 8 data terminals D0–D7. The OR gate 60 is coupled to a memory write control line 60a and a memory read control line 60b (both included in the control bus 20 shown in FIG. 1), and receives a memory write control signal / MEMW and a memory read control signal / MEMR, respectively. On the other hand, the decoder 62 has two inputs A0 and A1 to which the upper two address lines ADR-18 and ADR-019 are connected, respectively. The decoder 62 determines the meaning of a set of data which appears on the upper 2-bit lines ADR-18 to ADR-19, and outputs a 4-bit data therefrom which is applied to a chip select terminal / CS and an output enable terminal / OE of each of the memory chips 58a–58d. A write enable terminal / WE of each of the memory chips 58a–58d is coupled to an AND gate 70 of the control circuit 28.

The control circuit 28 comprises, in addition to the above-mentioned AND gate 70 and the delay circuit 82, three AND gates 72, 74 and 78, and a triple-state gate 80. The AND gate 72 is coupled to a control line 72a and is supplied with a ready signal / RDY from the main memory 14 while a program to be tested is executed. The output of the AND gate 72 is applied to the delay circuit 82 and the AND gate 74. The delay circuit 82 includes four flip-flops (not shown) and delays the control signal applied thereto by 4 timing clocks (for example) using a clock signal CK and the inverted clock signal / CK. The output of the delay circuit 82 is applied to the AND gate 70 and also to the decoder 50. The triple-state gate 80 is coupled to the aforesaid control line 60b and receives the signal / MEMR, while being controlled by a dump control signal DMP. The AND gate 74 receives the clock signal CK and the output of the AND gate 72, and applies the output thereof to the latch 54 of the OR circuit 24.

The input/output control circuit 30 includes two triple-stage gates 90, 92 and an AND gate 94. The triple-gate 90 is gated by a control signal applied via a line 90a when the memory chips 58a–58d are all cleared prior to the program testing. The AND gate 94 receives the control signal DMP and / MEMR, and applies the output thereof to the triple-stage gate 92 as a gate control signal. The gate 92 is rendered open when the program testing is terminated, and thus the contents of the memory chips 58a–58d are dumped to an external circuit (not shown) through the data bus 18.

Figure 3:
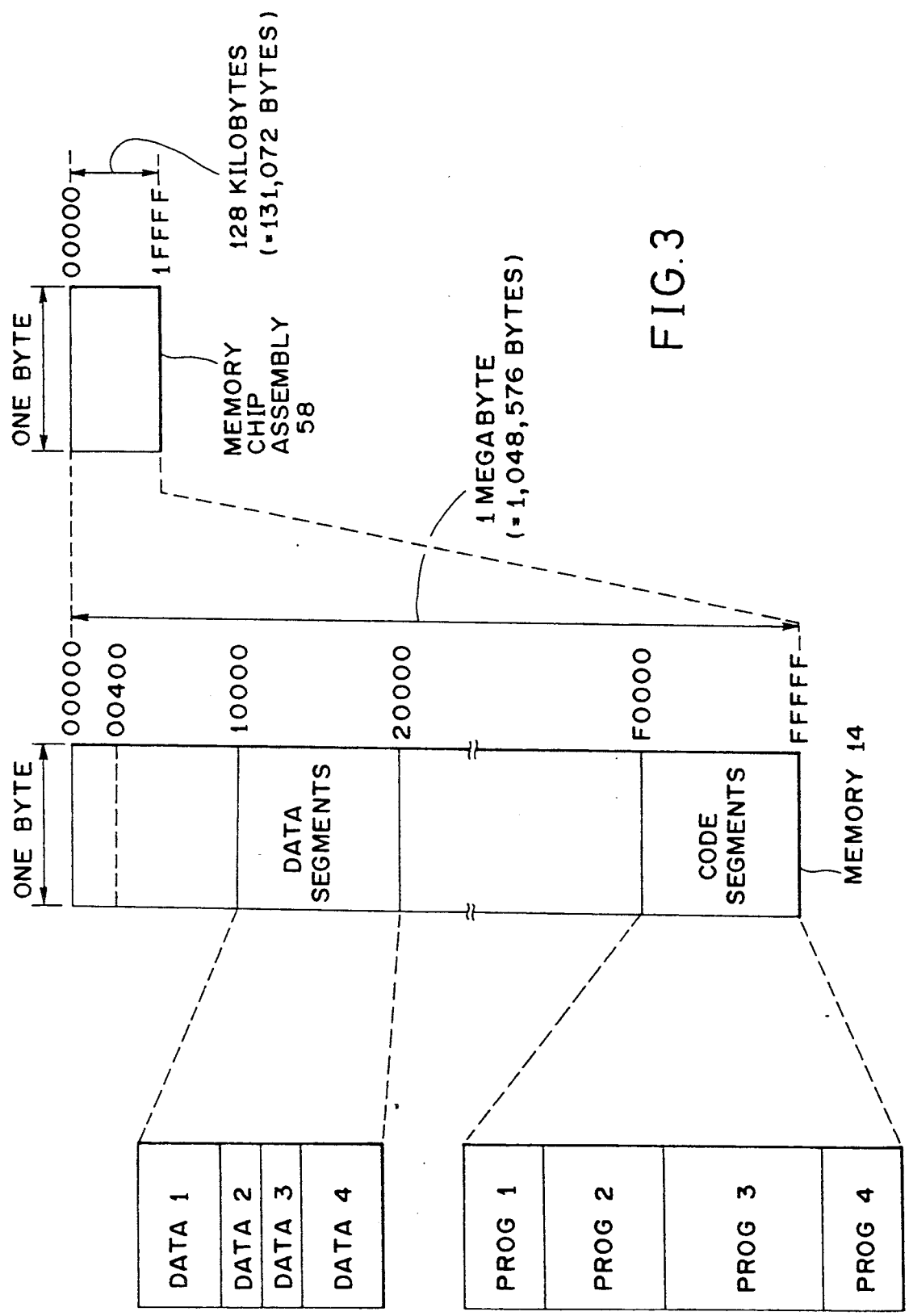
FIG. 3 shows memory maps of two memory means arranged in the FIG. 1 arrangement.

FIG. 3 shows the memory maps of the memory 14 as well as the memory chips 58a–58d. It has been assumed that the memory 14 has a memory capacity of one megabyte ($=1,048,576$ bytes) and hence the locations of the bytes are specified by the addresses 00000 to FFFFF in hexadicimal notation. Data stored in the main memory 14 take form of segments each of which may further be subdivided into smaller data sections DATA 1 to DATA 4 according to tasks or processes. Similarly, programs stored in the main memory 14 are divided into code segments and may further be subdivided into smaller parts PROG1 to PROG4.

Since access to a given memory cell depends on or varies with input data to a program, it is impossible to determine at what time point a specified byte address of the main memory 14 is to be accessed by the CPU 12. Further, depending on input data to a program, the CPU 12 makes accesses to some addresses and never to the others.

This invention is directed to ascertaining main memory addresses which have been accessed by the CPU 12 during the execution of a program. In order to specify the main memory addresses actually accessed by the CPU 12, the memory chip assembly (viz., memory) 58 is provided with the 128 kilobytes (=131,072 bytes=1,048,576 bits). That is to say, the byte addresses of the main memory 14 exactly corresponds to the binary cells of the memory 58. In the event that a given byte address of the main memory 14 is accessed by the CPU 12, a logic 1 (for example) is stored into a corresponding binary cell of the memory 58 as an access discriminating bit. This operation repeats until the program execution is terminated and thereafter the contents of the memory 58 are dumped.

Figure 4:
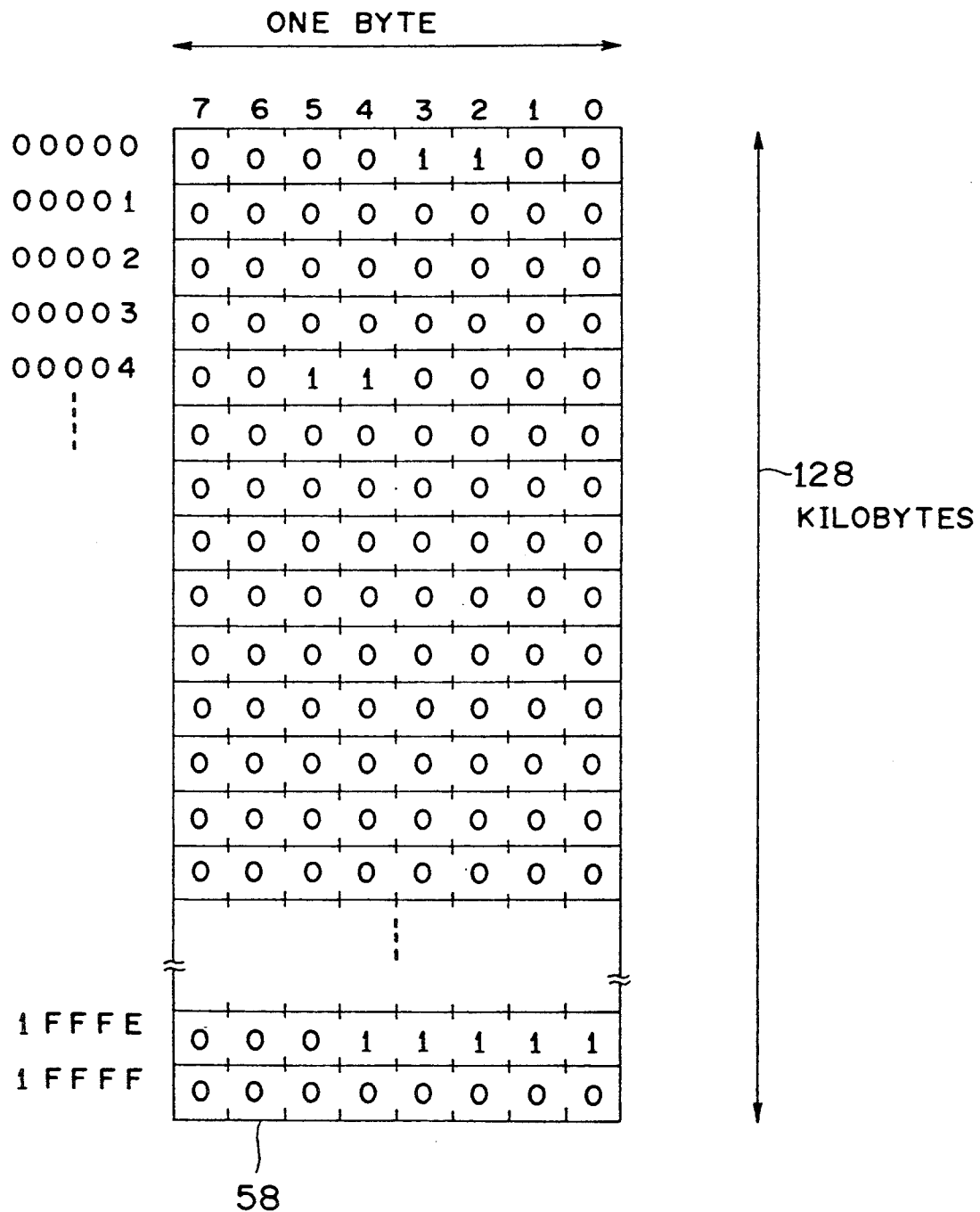
FIG. 4 is a memory map showing in detail one of the memory means shown in FIG. 3.

FIG. 4 is a memory map showing in detail the contents of the memory 58. As shown, the memory 58 is able to store one megabits (viz., 128 kilobytes) which correspond respectively to one megabytes of the main memory 14, as previously mentioned. FIG. 4 will be referred to in more detail later.

The operation of the FIG. 2 arrangement will be discussed with reference to the remaining drawings.

Prior to the execution of one of the programs previously stored in the main memory 14, the CPU 12 applies a control signal to the triple-state gate 90 via the line 90a, and opens the gate 90 to clear all the contents of the memory (viz., memory chip assembly) 58. That is to say, each of the binary cells of the memory 58 stores a logic 0 which is applied from the bus 18 along a data flow line A. It should be noted that a logical arrangement for enabling the CPU 12 to reset the memory 58 is not shown in the FIG. 2 arrangement merely for the sake of simplicity.

After the above-mentioned initial reset operation is completed, the program is allowed to run. When the CPU 12 makes access to the main memory 14 for read or write operation, the decoder 62 is enabled in response to the output of the OR gate 60. Accordingly, the address bits appearing on the address lines ADR-18 and ADR-19 are decoded and applied to the chip select terminal / CS and also to the output enable terminal / OE of the memory 58. Thus, one of the memory chips 58a–58d is selected and rendered operative. That is to say, the selected memory chip is allowed to output the contents thereof. On the other hand, the address bits on the address lines ADR-03 to ADR-17 are applied to the input terminals A00–A14 and specify one byte data within the selected memory chip. It follows that the byte data thus specified is read out from the memory 58 and applied to the latch 54 along a data flow line B. The one byte data latched is then fed to the OR gate 52.

In the case where the CPU 12 make a first access to the main memory 14, each bit of the one byte data applied to the OR gate 52 is a logic 0. The decoder 50 generates eight-bit data in which one bit assumes a logic 1. It follows that the output (eight bits) of the OR gate 52 includes one bit which assumes a logic 1. The triple-state gate 56 is rendered open in response to the ready signal appearing on the line 72a. Thus, the output of the OR gate 52 is written into or superimposed, along a data flow line C, on the one byte data which has been read out from the memory 58. This means that one of the memory chips 58a–58d, selected by the address bits on the lines ADR-18 and ADR-19, stores one logic 1 at the bit which corresponds to the byte address of the main memory 14 to which the CPU 12 has made access. Thus, one operation cycle is complete. It should be noted that when the selected memory chip stores the one byte data, it is enabled to write the data.

The above-mentioned operation cycle repeats. As a result, the binary cells of the memory 58, which assume logic 1's, increase as the CPU 12 continues to execute the program.

Returning to FIG. 4, wherein a logic 1 has been stored within each of the binary cells at the bit addresses 00002, 00003, 00024, 00025, . . . , 1FFF0, 1FFF1, 1FFF2, 1FFF3 and 1FFF4 merely by way of example.

When the program execution is terminated, the ready signal / RDY is no longer applied to the program testing arrangement 10 and instead the dump signal DMP is applied thereto. The dump signal DMP disables the write operation of the memory 58 and closes the triple-state gate 56, and renders the triple-state gate 92 open. Thus, the contents of the memory 58 are transferred to an external circuit (not shown) along a data flow line D.

Figure 5:
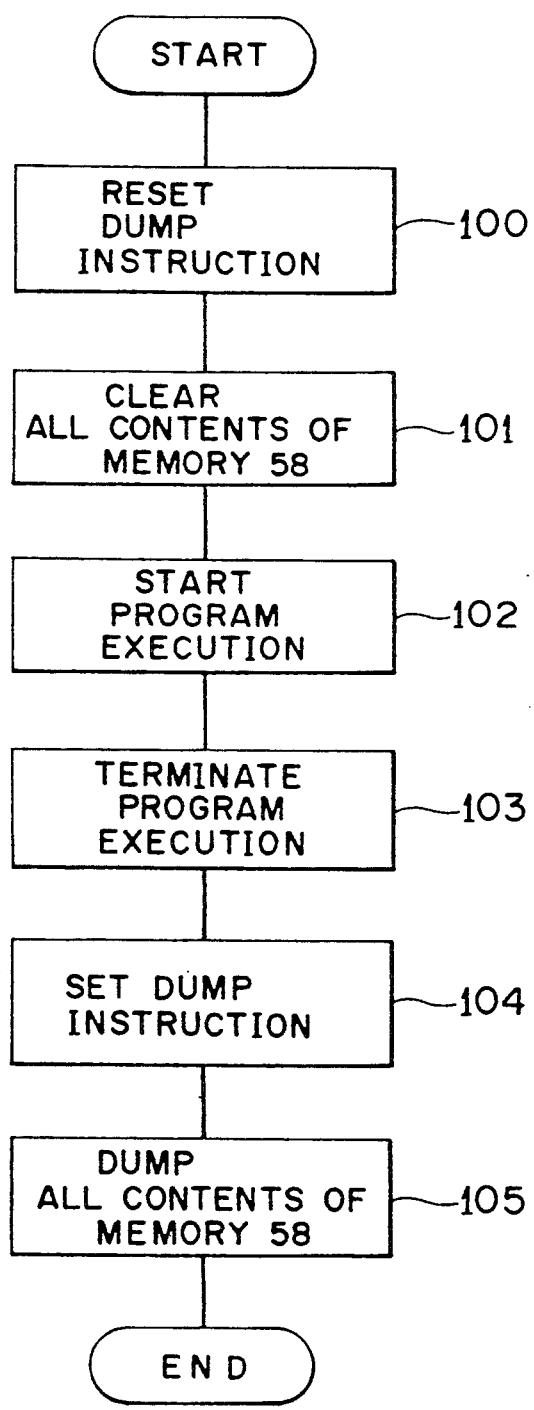
FIG. 5 is a flow chart for describing the operation of the embodiment of the present invention.

FIG. 5 is a flow chart showing the above-mentioned program testing operations in a very simplified manner. The operations at steps 100-105 have been described above, and hence further descriptions thereof will be omitted for brevity.

While the foregoing description describes one embodiment according to the present invention, the various alternatives and modifications possible without departing from the scope of the present invention, which is limited only by the appended claims, will be apparent to those skilled in the art.

What is claimed is:

1. An arrangement comprising:
    a central processing unit;
    first memory means, said first memory means being operatively coupled to said central processing unit via a plurality of buses, said first memory means including a plurality of memory cells which are specified by a plurality of address bits;
    decoding means, said decoding means receiving a predetermined number of lower n bits of said plurality of address bits and generating an output consisting of $2^n$ bits (n is a positive integer);
    second memory means, said second memory means having a plurality of binary cells, the binary cells corresponding to the memory cells of said first memory means on a one by one basis; and
    a logic circuit, said logic circuit receiving first and second data, said first data being the output of said decoding means and said second data being one cell data retrieved from said second memory means, said logic circuit implementing logical sum on said first and second data and superimposing the output thereof on the memory cell from which said second data has been derived.

2. An arrangement as claimed in claim 1, wherein the memory cell stores one byte data and wherein said positive integer n is 3.

3. An arrangement for ascertaining addresses of a main memory which have been accessed by a central processing unit during the execution of a program stored in said main memory, said arrangement comprising:

decoding means, said decoding means receiving a predetermined number of lower n bits of main memory address bits and generating an output consisting of $2^n$ bits (n is a positive integer);

memory means, said memory means having a plurality of binary cells, the binary cells corresponding to the memory cells of said main memory on a one by one basis; and a logic circuit, said logic circuit receiving first and second data, said first data being the output of said decoding means and said second data being one cell data retrieved from said memory means, said logic circuit implementing logical sum on said first and second data and superimposing the output thereof on the memory cell from which said second data has been derived.

4. An arrangement as claimed in claim 3, wherein the memory cell stores one byte data and wherein said positive integer n is 3.

5. An arrangement comprising:

a central processing unit;

first memory means, said first memory means being operatively coupled to said central processing unit via an address bus, a data bus and a control bus, said first memory means including a plurality of memory cells which are specified by a plurality of address bits;

decoding means, said decoding means being coupled to said address bus and receiving a predetermined number of lower n bits of said plurality of address bits and generating an output consisting of $2^n$ bits (n is a positive integer);

second memory means, said second memory means being coupled to said address bus and said control bus, said second memory means having a plurality of binary cells, the binary cells corresponding to the memory cells of said first memory means on a one by one basis;

a logic circuit, said logic circuit receiving first and second data, said first data being the output of said decoding means and said second data being one cell data retrieved from said second memory means, said logic circuit implementing logical sum on said first and second data and superimposing the output thereof on the memory cell from which said second data has been derived;

first control means, said first control means being coupled to said data and control buses and said second memory, said first control means allowing to dump said second memory means; and second control means, said second control means being coupled to control said decoding means, said second memory means and said logic circuit.

6. An arrangement as claimed in claim 5, wherein the memory cell stores one byte data and wherein said positive integer n is 3.

7. A method of ascertaining addresses of a main memory which have been accessed by a central processing unit during the execution of a program stored in said main memory, said method comprising the steps of:

(a) arranging a plurality of binary cells, the binary cells corresponding to the memory cells of said main memory on a one by one basis;

(b) receiving a predetermined number of lower n bits of main memory address bits and generating an output consisting of $2^n$ bits (n is a positive integer); and (c) receiving first and second data, said first data being generated at said step (b) and said second data being one cell data retrieved from said memory means, and implementing logical sum on said first and second data and superimposing the output thereof on the memory cell from which said second data has been derived.

* * * * *